United States Patent
Yamano

(10) Patent No.: US 12,529,735 B2
(45) Date of Patent: Jan. 20, 2026

(54) METHOD OF ESTIMATING MAGNETIC FIELD STRENGTH

(71) Applicant: TOYOTA JIDOSHA KABUSHIKI KAISHA, Toyota (JP)

(72) Inventor: Hayate Yamano, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 134 days.

(21) Appl. No.: 18/599,460

(22) Filed: Mar. 8, 2024

(65) Prior Publication Data

US 2024/0329160 A1    Oct. 3, 2024

(30) Foreign Application Priority Data

Apr. 3, 2023 (JP) .................................. 2023-059997

(51) Int. Cl.
  *G01R 33/02* (2006.01)
  *G01R 33/032* (2006.01)

(52) U.S. Cl.
  CPC ................................ *G01R 33/032* (2013.01)

(58) Field of Classification Search
  CPC ...... G01R 33/032; G01R 33/24; G01R 33/26; G01R 33/60; G01R 33/323; G01N 24/10
  See application file for complete search history.

(56) References Cited

U.S. PATENT DOCUMENTS

| | | | |
|---|---|---|---|
| 2019/0146045 A1* | 5/2019 | Niu ....................... | G01R 33/032 324/304 |
| 2019/0154766 A1* | 5/2019 | Lutz ..................... | G01R 15/245 |
| 2020/0057117 A1* | 2/2020 | Nishibayashi ..... | G01R 33/0017 |
| 2020/0225041 A1* | 7/2020 | Boka ...................... | G01R 33/26 |
| 2023/0266415 A1* | 8/2023 | Brenneis ............... | G01R 33/26 324/304 |

OTHER PUBLICATIONS

Felix M. Sturner et al., "Compact integrated magnetometer based on nitrogen-vacancy centres in diamond", Diamond & Related Materials 93 (2019) 59-65, http://www.elsevier.com/locate/diamond.

Akihiro Kuwahata et al., "Magnetometer with nitrogen-vacancy center in a bulk diamond for detecting magnetic nanoparticles in biomedical applications", Scientific Reports (2020) 10:2483, https://doi.org/10.1038/s41598-020-59064-6.

Kento Sasaki et al., "Broadband, large-area microwave antenna for optically detected magnetic resonance of nitrogen-vacancy centers in diamond", Review of Scientific Instruments 87, 053904 (2016), http://dx.doi.org/10.1063/1.4952418.

* cited by examiner

*Primary Examiner* — Thang X Le
(74) *Attorney, Agent, or Firm* — Dickinson Wright, PLLC

(57) ABSTRACT

Provided is a method of estimating a magnetic field strength with a higher accuracy. The method of estimating a magnetic field strength includes detecting fluorescence emitted from diamond having nitrogen-vacancy centers with an external magnetic field applied thereto, by irradiating the diamond with excitation light and sweeping microwaves; removing, as noise, a long-periodic component having a value greater than a preset threshold from the detected fluorescence; fitting the fluorescence remaining after the removing of noise; and estimating a strength of the external magnetic field based on the fluorescence after the fitting.

6 Claims, 12 Drawing Sheets

METHOD OF ESTIMATING MAGNETIC FIELD STRENGTH

CROSS REFERENCE TO RELATED APPLICATIONS

The present application claims priority from Japanese patent application JP 2023-059997 filed on Apr. 3, 2023, the entire content of which is hereby incorporated by reference into this application.

BACKGROUND

Technical Field

The present disclosure relates to a method of estimating a magnetic field strength, and particularly to a method of estimating a magnetic field strength using a diamond sensor.

Background Art

The diamond sensor is also referred to as a quantum sensor, which uses the property of nitrogen-vacancy centers (i.e., NV centers) in diamond that sensitively detect an environmental change and produce changes in their quantum states. The diamond sensor is expected to have many applications as a highly-sensitive sensor for detection of magnetic field, electric field, temperature, distortion, and the like.

Techniques related to the diamond sensor are known, such as those described in Felix M. Sturner et al., "Compact integrated magnetometer based on nitrogen-vacancy centres in diamond", Diamond & Related Materials 93 (2019) 59-65, http://www.elsevier.com/locate/diamond; Akihiro Kuwahata et al., "Magnetometer with nitrogen-vacancy center in a bulk diamond for detecting magnetic nanoparticles in biomedical applications", Scientific Reports (2020) 10:2483, https://doi.org/10.1038/s41598-020-59064-6; and Kento Sasaki et al., "Broadband, large-area microwave antenna for optically detected magnetic resonance of nitrogen-vacancy centers in diamond", Review of Scientific Instruments 87, 053904 (2016), http://dx.doi.org/10.1063/1.4952418. As one example, Felix M. Sturner et al. describes a technique using the property (the Zeeman effect) that the resonance frequency in quantum state varies depending on the magnetic field strength. The technique by Felix M. Sturner et al. irradiates NV centers in diamond with green excitation light and sweeps microwaves while applying an external magnetic field, acquires a spectrum of red fluorescence emitted from the NV centers, and estimates a magnetic field strength based on the peak frequency (i.e., resonance frequency) in the acquired spectrum.

SUMMARY

However, the estimation method described in Felix M. Sturner et al. has some issues that affect the accuracy in estimating a magnetic field strength since the acquired fluorescence spectrum includes environmental noise, such as fluctuations in electric field and fluctuations in magnetic field, and also other noise, such as fluctuations in excitation light.

The present disclosure has been made in view of such technical issues, and provides a method of estimating a magnetic field strength with a higher accuracy.

A method of estimating a magnetic field strength according to the present disclosure includes the steps of: detecting fluorescence emitted from diamond having nitrogen-vacancy centers with an external magnetic field applied thereto, by irradiating the diamond with excitation light and sweeping microwaves; removing, as noise, a long-periodic component having a value greater than a preset threshold from the detected fluorescence; fitting the fluorescence remaining after the removing of noise; and estimating a strength of the external magnetic field based on the fluorescence after the fitting.

By removing, as noise, a long-periodic component having a value greater than a preset threshold from the detected fluorescence, the method of estimating a magnetic field strength according to the present disclosure can remove environmental noise, such as fluctuations in electric field and fluctuations in magnetic field, and also other noise, such as fluctuations in excitation light, and thus can obtain a higher accuracy in estimating a magnetic field strength. This allows precise estimation of a magnetic field strength even in an environment with fluctuations in electric field, fluctuations in magnetic field, and fluctuations in excitation light.

In the method of estimating a magnetic field strength according to the present disclosure, the threshold may be a frequency threshold, and the step of removing may include performing a fast Fourier transform on an intensity-time signal of the detected fluorescence to acquire frequencies of the fluorescence, removing, as noise, a frequency lower than the frequency threshold from the acquired frequencies of the fluorescence, and performing an inverse fast Fourier transform on a remaining frequency of the fluorescence. This can suitably remove environmental noise, such as fluctuations in electric field and fluctuations in magnetic field, and also other noise, such as fluctuations in excitation light, and thus can obtain a higher accuracy in estimating a magnetic field strength.

In addition, in the method of estimating a magnetic field strength according to the present disclosure, the step of removing may include zeroing a value larger than 0 of an intensity of the fluorescence acquired by the inverse fast Fourier transform. This can improve the fitting accuracy and thus can further improve the accuracy in estimating a magnetic field strength.

In addition, in the method of estimating a magnetic field strength according to the present disclosure, the frequency threshold may be 0.4 (1/MHz) or smaller. This can surely improve the accuracy in estimating a magnetic field strength.

In addition, in the method of estimating a magnetic field strength according to the present disclosure, the step of removing may include squaring an intensity of the fluorescence acquired by the inverse fast Fourier transform and then adding a minus sign. This can improve the fitting accuracy and thus can further improve the accuracy in estimating a magnetic field strength.

Furthermore, in the method of estimating a magnetic field strength according to the present disclosure, the step of detecting may include sweeping the microwaves multiple times on the diamond and averaging of the fluorescence detected multiple times. This can further improve the accuracy in estimating a magnetic field strength.

According to the present disclosure, it is possible to obtain a higher accuracy in estimating a magnetic field strength.

DETAILED DESCRIPTION

Hereinafter, an embodiment of a method of estimating a magnetic field strength according to the present disclosure will be described with reference to the drawings. In the following description, unless otherwise specified, the term "spectrum" indicates the intensity of detected fluorescence and has the same meaning as "fluorescence intensity."

Before describing the embodiment, circumstances of how the present disclosure has been attained will be explained.

Figure 5:
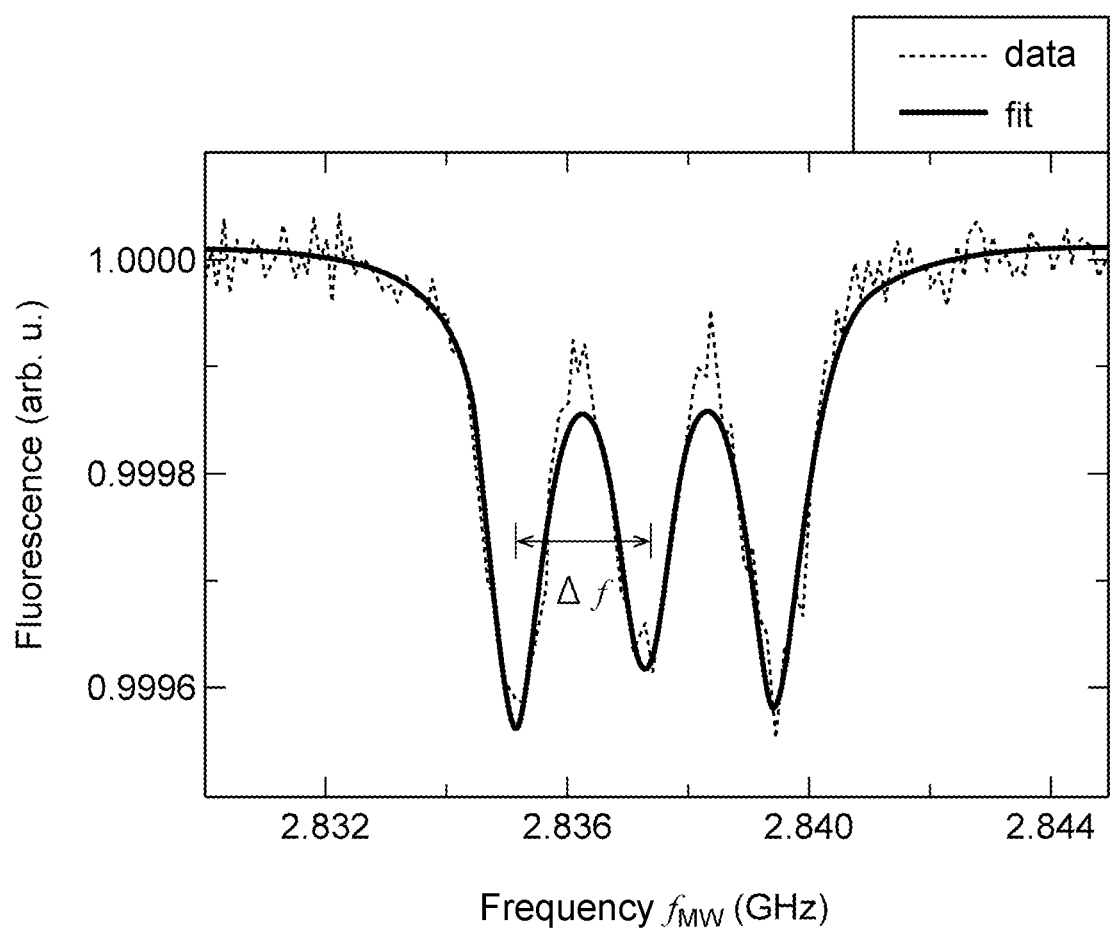
FIG. 5 is a diagram showing the fluorescence detection results described in Felix M. Sturner et al.

FIG. 5 is equivalent to FIG. 3(c) presented in Felix M. Sturner et al., showing the intensity of red fluorescence detected using the method described in Felix M. Sturner et al. In FIG. 5, the horizontal axis is the frequency of microwaves used in the diamond sensor and the vertical axis is the spectrum (arbitrary unit) indicating the intensity of detected fluorescence.

As shown in FIG. 5, when the microwave frequency of around 2.8 GHz is swept, optically detected magnetic resonance (ODMR) causes a drop in fluorescence intensity, resulting in three peaks ("valley" portions in FIG. 5) indicating such a drop in intensity. The magnetic field strength can be estimated based on these peaks. Note that the position of a set of three peaks linearly changes according to the magnetic field strength, that is, the set of three peaks moves to the right or left with their relative positions unchanged.

In FIG. 5, the dashed line shows measured data and the solid line shows a result of fitting the measured data with a Lorentzian function. It is considered that the fitting, as described herein, was performed to reduce environmental noise, such as fluctuations in electric field and fluctuations in magnetic field, and also other noise, such as fluctuations in excitation light.

To estimate the strength of an external magnetic field based on the peak frequency (i.e., resonance frequency) in the spectrum, first, a shift amount $\Delta f$ of the resonance frequency is calculated, and then, a magnetic field strength B is estimated by $B=\Delta f/\gamma$ ($\gamma$ is the gyromagnetic ratio of electron spin). The magnetic field strength B is equal to a magnetic flux density representing the strength of a magnetic field.

The accuracy in estimating a magnetic field strength is determined by the resonance frequency (i.e., the center position of the peaks) in the fluorescence spectrum. That is, the accuracy in estimating a magnetic field strength is determined by an error range of an estimate of the center position obtained by fitting (for example, fitting with non-linear least squares). While the error range may be defined in various ways, the present embodiment defines the error range as a standard deviation (1σ) of the estimate obtained by fitting.

The shift amount $\Delta f$ of the resonance frequency can be calculated from the result of fitting three peaks with the Lorentzian function and estimating the center position of the peaks. The center position of the peaks may be estimated by two methods: obtaining an average of the fitting results of the three peaks (hereinafter referred to as "Method 1"); and obtaining a fitting result of the peak in the middle among the three peaks (hereinafter referred to as "Method 2"). Felix M. Sturner et al. does not specify which of these two methods is used. Method 1 obtains an average of substantially three fitting results (n=3), whereas Method 2 obtains one fitting result (n=1). Thus, it is considered that use of Method 1 can obtain a more accurate estimation.

Figure 1:
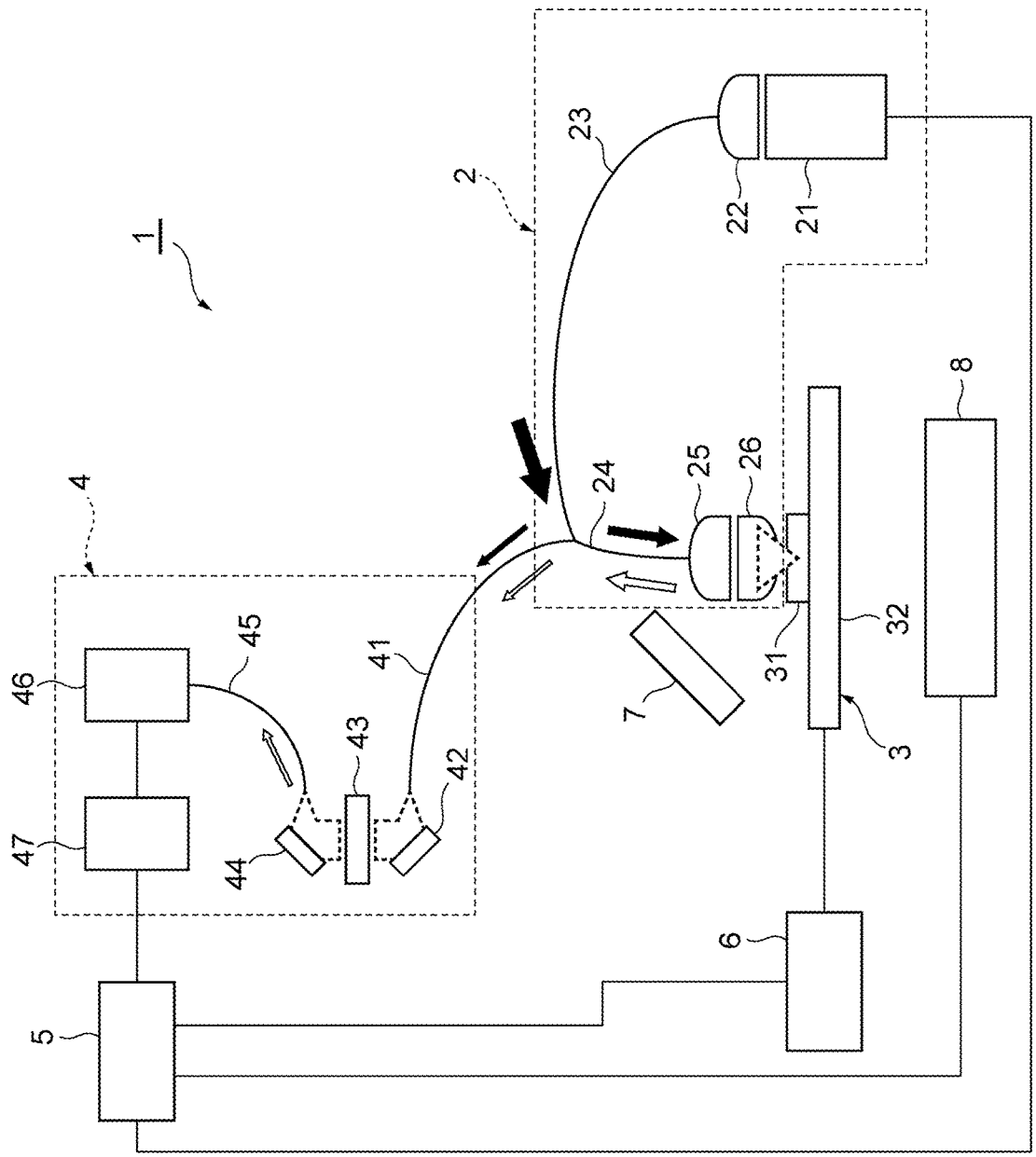
FIG. 1 is a schematic view of the configuration of a diamond sensor.
Figure 7:
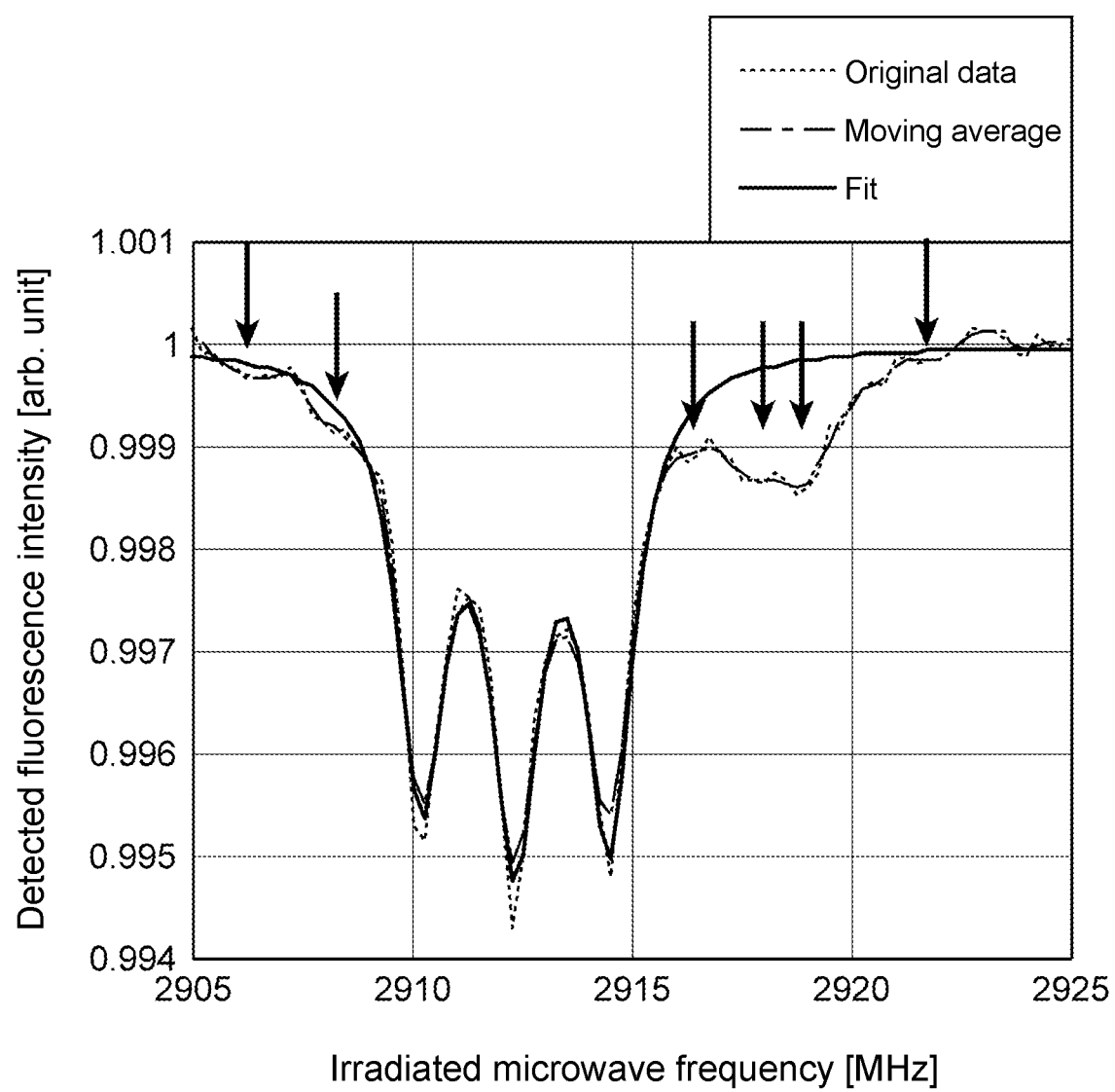
FIG. 7 is a diagram showing a fluorescence intensity acquired by the estimation method described in Felix M. Sturner et al. with a combination of a moving average and an arithmetic average added thereto.

The inventor of the present application first replicated the estimation of a magnetic field strength based on the method described in Felix M. Sturner et al. The diamond sensor used in replication is shown in FIG. 1, which was fabricated with reference to FIG. 2(a) and FIG. 7 presented in Akihiro Kuwahata et al. In the replication, the inventor of the present application estimated a resonance frequency using Method 1 described above.

[Regarding Structure of Diamond Sensor]

As shown in FIG. 1, the diamond sensor 1 is a device for estimating a magnetic field strength, which mainly includes an excitation light emitting unit 2, a sensor unit 3 on which a diamond 31 is placed, a microwave source 6, a magnet 7, a detection unit 4, and a control unit 5.

The excitation light emitting unit 2 includes a laser light source 21 that generates excitation light to irradiate the diamond 31, a first lens 22 for guiding the excitation light from the laser light source 21 to an optical fiber 23, the optical fiber 23 for guiding the excitation light toward the diamond 31, an optical fiber 24 coupled with the optical fiber 23 via a fiber coupler (not shown), and a second lens 25 and a third lens 26 that are optically coupled with the optical fiber 24. The laser light source 21 is controlled by the control unit 5 to output green excitation light.

Figure 2:
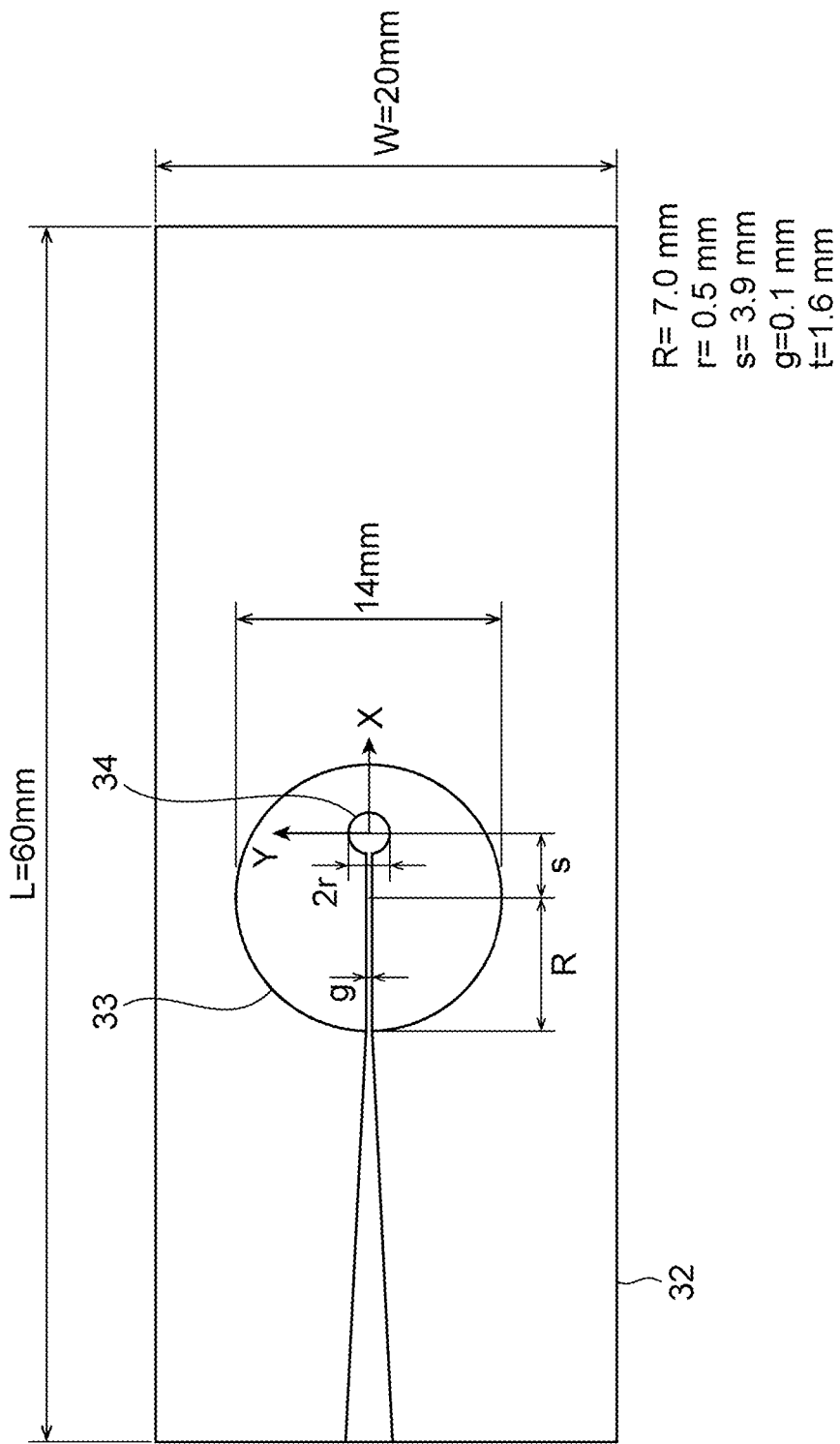
FIG. 2 is a plan view of a microwave-irradiated substrate.

The sensor unit 3 includes a microwave-irradiated substrate 32 on which the diamond 31 is placed. The diamond 31 has a plurality of NV centers, and emits fluorescence when irradiated with excitation light from the laser light source 21. The microwave-irradiated substrate 32 has a rectangular shape in plan view, for example, as shown in FIG. 2. This microwave-irradiated substrate 32 has the same structure and dimensions as the microwave antenna shown in FIG. 1 of Kento Sasaki et al. The microwave-irradiated substrate 32 has the length L=60 mm, the width W=20 mm, and the thickness t=1.6 mm. The microwave-irradiated substrate 32 has a circle 33 having the radius R=7.0 mm at the center, a hole 34 having the radius r=0.5 mm, and the distance s=3.9 mm between the center of the circle 33 and the center of the hole 34. The microwave-irradiated substrate 32 further has the slit width g=0.1 mm. Note that the circle 33 is made of copper foil, for example.

The microwave source 6 is controlled by the control unit 5 to irradiate the diamond 31 with microwaves with variable frequencies and sweep the microwaves. The magnet 7 is composed of a permanent magnet, and serves to improve responsivity to magnetic fields when a magnetic field of about 2 to 3 mT is applied to the location of the diamond 31. The magnetic field source 8 is a source of magnetic field that is a target for estimation. The magnetic field source 8 can apply an external magnetic field to the diamond 31. Examples of the magnetic field source 8 include a magnet, a ferromagnet, an electric circuit or copper wire through which electric current flows, and the like.

The detection unit 4 includes an optical fiber 41 coupled with the optical fiber 23 and the optical fiber 24 via a fiber coupler (not shown), an optical fiber 45 coupled with the optical fiber 41 via a first mirror 42, a filter 43 and a second mirror 44, a photodetector 46 that detects light guided by the optical fiber 45, and a voltmeter 47.

The filter 43 is configured to allow only red fluorescence emitted from the diamond 31 to pass therethrough, and not to allow light other than the red fluorescence to pass therethrough. The photodetector 46 includes a photodiode, for example, and detects fluorescence guided by the optical fiber 45 and outputs a signal of the detected fluorescence (for example, an intensity-time signal of the fluorescence) to the control unit 5.

The control unit 5 is a microcomputer including a CPU (Central processing unit) performing operations, a ROM (Read only memory) as a secondary storage unit storing programs for the operations, and a RAM (Random access memory) as a temporary storage unit storing operation processes and storing temporary control variables, for example. The control unit 5 executes stored programs to control the components of the diamond sensor 1, perform calculations related to the estimation of a magnetic field strength, and the like.

For example, the control unit 5 is electrically connected to the laser light source 21, the microwave source 6, and the magnetic field source 8, and controls their operation timings, outputs, operation times, and the like. The control unit 5 also estimates the magnetic field strength based on the intensity-time signal of the fluorescence outputted from the photodetector 46, for example. Note that by way of example, the magnetic field source 8 is electrically connected to the control unit 5 in the present embodiment, but the magnetic field source 8 need not always be connected to the control unit 5.

[Regarding Method of Estimating Magnetic Field Strength Described in Felix M. Sturner et al.]

Figure 3:
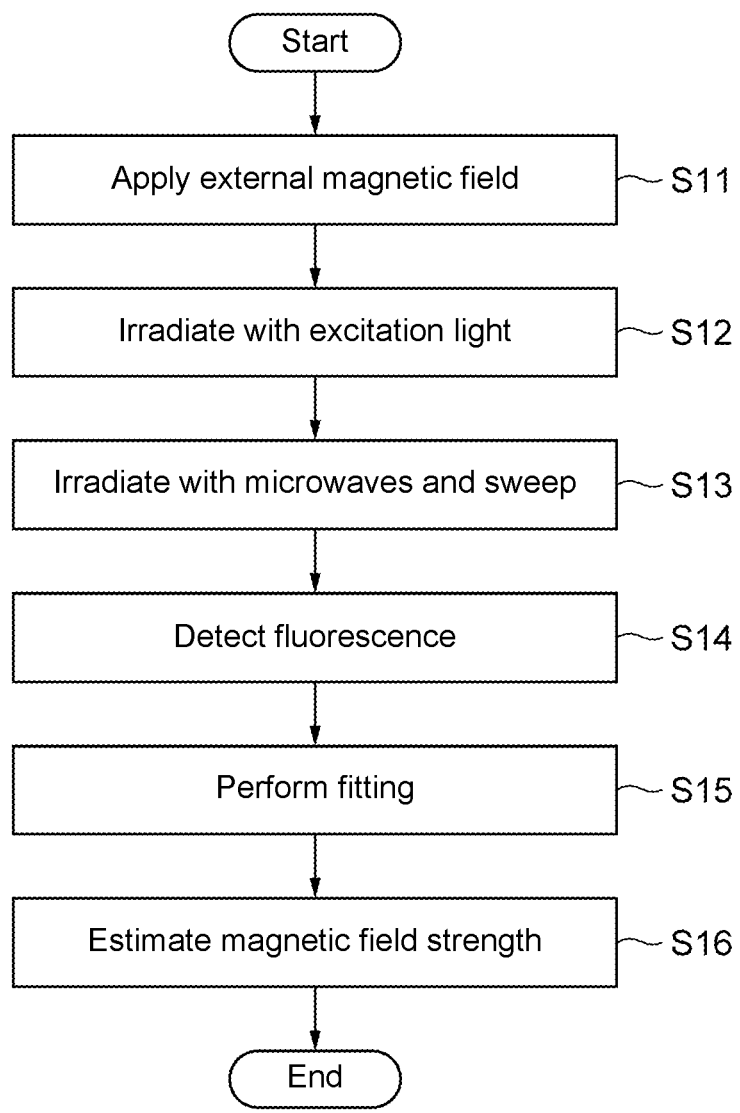
FIG. 3 is a flowchart of the estimation method described in Felix M. Sturner et al. as replicated.

Next, the inventor of the present application estimated a magnetic field strength based on the method described in Felix M. Sturner et al. using the above-described diamond sensor 1. FIG. 3 is a flowchart of the estimation method described in Felix M. Sturner et al. as replicated.

First, in an external magnetic field application step S11, the magnetic field source 8 applies an external magnetic field to the diamond 31, that is, applies a magnetic field that is a target for estimation, according to a command from the control unit 5. When the magnetic field source 8 is a copper wire, for example, the magnetic field source 8 passes an electric current therethrough to apply an external magnetic field according to a command from the control unit 5. Meanwhile, when the magnetic field source 8 is a magnet or ferromagnet (that is, something that generates a magnetic field by itself), for example, the magnetic field source 8 applies an external magnetic field by being moved closer to the diamond 31 according to a command from the control unit 5. In an excitation light emission step S12 following the external magnetic field application step S11, the laser light source 21 irradiates the diamond 31 with excitation light according to a command from the control unit 5. The excitation light is green laser light of 532 nm, for example, and has a power of 2 mW. The green excitation light is guided by the first lens 22, the optical fiber 23 and the optical fiber 24, and further passes through the second lens 25 and the third lens 26 to irradiate the diamond 31.

When irradiated with the green excitation light, the NV centers in the diamond 31 emit red fluorescence. Part of the emitted red fluorescence and the green excitation light is guided to the filter 43 via the optical fiber 24, the optical fiber 41 and the first mirror 42.

The filter 43 is configured to allow only the red fluorescence emitted from the diamond 31 to pass therethrough, and not to allow light other than the red fluorescence to pass therethrough. Thus, the red fluorescence passes through the filter 43, whereas the green excitation light and other light are cut. The red fluorescence passed through the filter 43 is further guided to the photodetector 46 by the second mirror 44 and the optical fiber 45.

In a microwave irradiation and sweep step S13 following the excitation light emission step S12, the microwave source 6 irradiates the microwave-irradiated substrate 32 with microwaves and sweeps the microwaves according to a command from the control unit 5. The microwave frequency can vary depending on the strength of the external magnetic field applied. Herein, the microwave frequency is within the range of 2905 MHz to 2925 MHz, for example. In addition, the sweep is performed at 0.25 MHz/step, for example, and the microwaves have a power of 0 dBm.

Sweeping the microwaves with 2905 MHz to 2925 MHz will cause optically detected magnetic resonance (ODMR) of the electron spin of the NV center, making the red fluorescence from the diamond 31 quickly weakened. That is, the intensity of the red fluorescence in the resonance frequency sharply drops.

In a fluorescence detection step S14 following the microwave irradiation and sweep step S13, the photodetector 46 detects red fluorescence and outputs an intensity-time signal of the detected fluorescence to the control unit 5.

In a fitting step S15 following the fluorescence detection step S14, the control unit 5 first acquires the intensity-time signal of the fluorescence outputted from the photodetector 46, and then acquires a spectrum indicating the fluorescence intensity based on the acquired intensity-time signal of the fluorescence. The acquired fluorescence spectrum contains three peaks ("valley" portions in FIG. 5) indicating a sharp drop in fluorescence intensity.

Next, the control unit 5 performs fitting of the three peaks with the Lorentzian function and estimates the center position of the peaks (i.e., resonance frequency).

In a magnetic field strength estimation step S16 following the fitting step S15, the control unit 5 first obtains a difference between the resonance frequency estimated by fitting and the resonance frequency when an external magnetic field is not applied, and then obtains a shift amount $\Delta f$ of the resonance frequency under the external magnetic field. Then, based on the obtained shift amount $\Delta f$, the control unit 5 estimates a magnetic field strength B (that is, the strength of the external magnetic field applied by the magnetic field source 8) by $B=\Delta f/\gamma$, where $\gamma$ is the gyromagnetic ratio of electron spin, for example, 28 MHz/mT.

Figure 6:
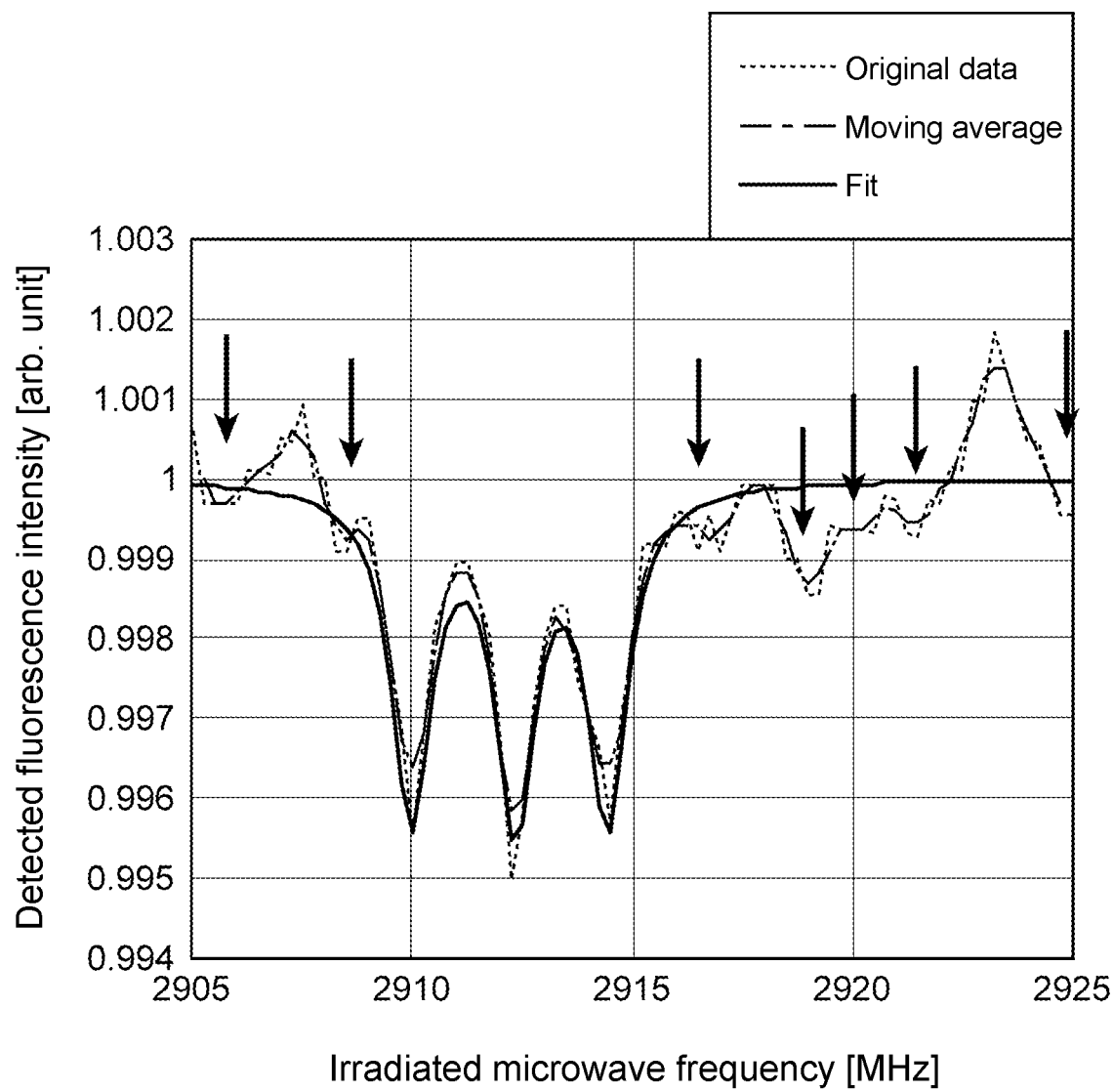
FIG. 6 is a diagram showing a fluorescence intensity acquired by replication of the estimation method described in Felix M. Sturner et al.

FIG. 6 is a diagram showing a fluorescence intensity acquired by replication of the estimation method described in Felix M. Sturner et al. In FIG. 6, like FIG. 5, the horizontal axis is the frequency of microwaves used in the diamond sensor 1 and the vertical axis is the spectrum (arbitrary unit) indicating the intensity of detected fluorescence.

As can be seen from the comparison between FIG. 6 and FIG. 5, FIG. 6, which shows the result of the replication of the estimation method described in Felix M. Sturner et al., contains baseline drift that does not appear in Felix M. Sturner et al. or peak form (see the arrows in FIG. 6). Such baseline drift or peak form is the appearance of noise, and may adversely affect the fitting accuracy, by extension, the accuracy in estimating a magnetic field strength.

The occurrence of such baseline drift or peak form is assumed to be caused by environmental noise, such as fluctuations in electric field and fluctuations in magnetic field that exist in measurement environment, and also by other noise, such as fluctuations in excitation light. Note that Felix M. Sturner et al. does not include description of the measurement environment, and it is therefore unclear in what environment the measurement is performed. In contrast, the measurement environment in the replication by the inventor of the present application is performed in a typical laboratory without taking any measures against environmental noise.

When the occurrence of such baseline drift or peak form is caused by environmental noise, measures that may be taken to solve the problem include measurement in a shield room, for example. However, when the diamond sensor 1 is used as an in-vehicle sensor, it is difficult to take such a measure as in a shield room. Meanwhile, when the occurrence of baseline drift or peak form is caused by fluctuations in excitation light, use of an expensive laser light source provided with an excitation light stabilizing mechanism may solve the problem, but may increase the cost of the diamond sensor 1. Furthermore, when the occurrence of baseline drift or peak form is caused by noise other than the above-described environmental noise and fluctuations in excitation light, use of an expensive laser light source cannot remove such noise.

Accordingly, when the diamond sensor 1 is used in a typical environment including the potential for use as an in-vehicle sensor, it is required to eliminate the influence of noise as described above.

For noise reduction, it is known that use of a moving average and an arithmetic average is effective. Accordingly, the inventor of the present application first performed a moving-average process on the intensity-time signal of the detected fluorescence. However, as shown in FIG. 6, the inventor of the present application found that noise components (see the arrows in FIG. 6) remained even with the moving average (see the alternate long and short dash line in FIG. 6). Note that the moving average herein is an auxiliary line used so that it is easier to understood visually. Further, the fit shown in FIG. 6 is a result of directly fitting original data.

Next, the inventor of the present application attempted to reduce noise using the combination of the moving average and the arithmetic average. FIG. 7 is a diagram showing a fluorescence intensity acquired by the estimation method described in Felix M. Sturner et al. with the combination of the moving average and the arithmetic average (n=10) added thereto. As shown in FIG. 7, the inventor of the present application found that noise components (see the arrows in FIG. 7) remained even with the combination of the moving average (see the alternate long and short dash line in FIG. 7) and the arithmetic average (n=10). Note that the moving average of FIG. 7 is an auxiliary line used so that it is easier to understood visually. Further, the fit shown in FIG. 7 is a result of directly fitting original data.

Figure 8:
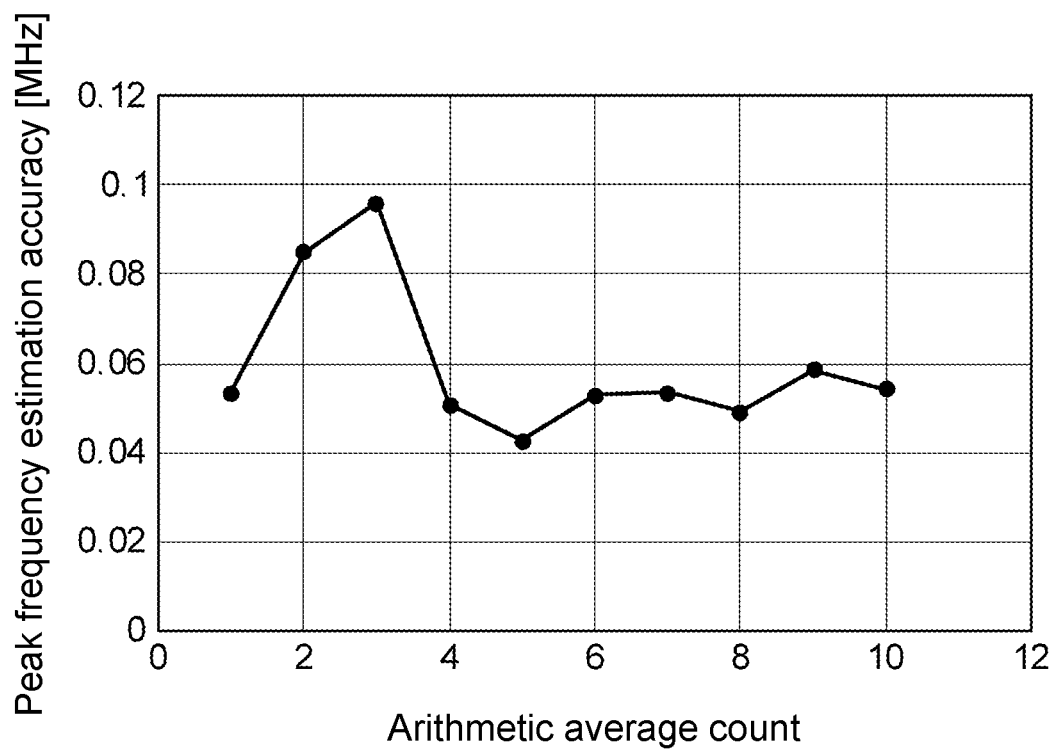
FIG. 8 is a diagram showing the relationship between the arithmetic average count and the accuracy in estimating a peak frequency.

Furthermore, the inventor of the present application studied the relationship between the arithmetic average count and the accuracy in estimating a peak frequency as shown in FIG. 8. As a result, the inventor of the present application found that the accuracy in estimating a peak frequency was not improved even with a change in the arithmetic average count.

In view of the above, the inventor of the present application found that in the estimation method described in Felix M. Sturner et al., the accuracy in estimating a magnetic field strength was not improved even with the use of the arithmetic average and the moving average.

Then, the inventor of the present application conducted intensive studies and then found that removing, as noise, a long-periodic component having a value greater than a preset threshold from the detected fluorescence could successfully obtain a higher accuracy in estimating a magnetic field strength, thereby completing the present disclosure. More specifically, a higher accuracy in estimating a magnetic field strength can be obtained by performing a fast Fourier transform on the intensity-time signal of the detected fluorescence to acquire fluorescence frequencies and removing, as noise, a frequency lower than a preset frequency threshold from the acquired fluorescence frequencies.

[Regarding Method of Estimating Magnetic Field Strength According to Embodiment]

Figure 4:
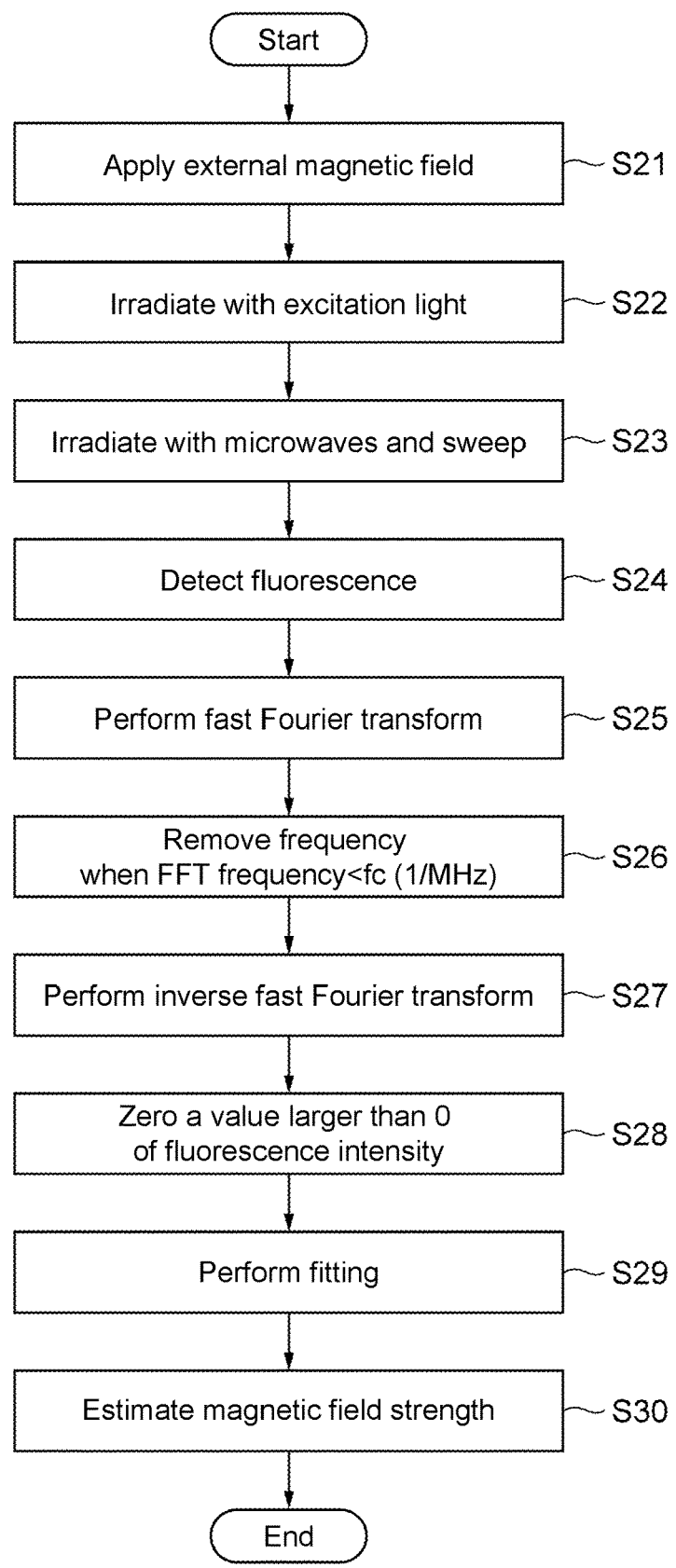
FIG. 4 is a flowchart of a method of estimating a magnetic field strength according to an embodiment.

To achieve the foregoing, the method of estimating a magnetic field strength according to the present embodiment includes, as shown in FIG. 4, an external magnetic field application step S21, an excitation light emission step S22, a microwave irradiation and sweep step S23, a fluorescence detection step S24, a fast Fourier transform step S25, an FFT frequency removal step S26, an inverse fast Fourier transform step S27, a fluorescence intensity post-processing step S28, a fitting step S29, and a magnetic field strength estimation step S30.

The external magnetic field application step S21 to the fluorescence detection step S24 are the same as the above-described steps S11 to S14, and thus repeated description thereof will be omitted.

In the fast Fourier transform step S25 following the fluorescence detection step S24, the control unit 5 first acquires the intensity-time signal of the fluorescence outputted from the photodetector 46, and then performs a fast Fourier transform (FFT) on the acquired intensity-signal of the fluorescence to acquire fluorescence frequencies (FFT frequencies). That is, using the fast Fourier transform, the control unit 5 converts the intensity-signal of the fluorescence from a time domain signal of the fluorescence to a frequency domain signal.

In the FFT frequency removal step S26 following the fast Fourier transform step S25, the control unit 5 compares the FFT frequencies acquired in step S25 with a preset frequency threshold fc, and removes, as noise, a frequency lower than the frequency threshold fc from the FFT frequencies of the fluorescence. The frequency threshold fc may be 0.4 (1/MHz) or smaller. The reason for this will be described later in Examples 1 to 5. Note that 1/MHz, which is the unit of the frequency threshold fc, is determined based on the spectrum indicating the fluorescence intensity, and does not have a physical meaning.

In the inverse fast Fourier transform step S27 following the FFT frequency removal step S26, the control unit 5 performs an inverse fast Fourier transform on a remaining FFT frequency of the fluorescence (i.e., an FFT frequency higher than or equal to the frequency threshold fc) to acquire a fluorescence intensity (i.e., spectrum).

In the fluorescence intensity post-processing step S28 following the inverse fast Fourier transform step S27, the control unit 5 zeroes a value larger than 0 of the fluorescence intensity obtained by the inverse fast Fourier transform. Hereinafter, the reason for zeroing a value larger than 0 of the fluorescence intensity will be described referring to FIG. 9 and FIG. 10.

Figure 9:
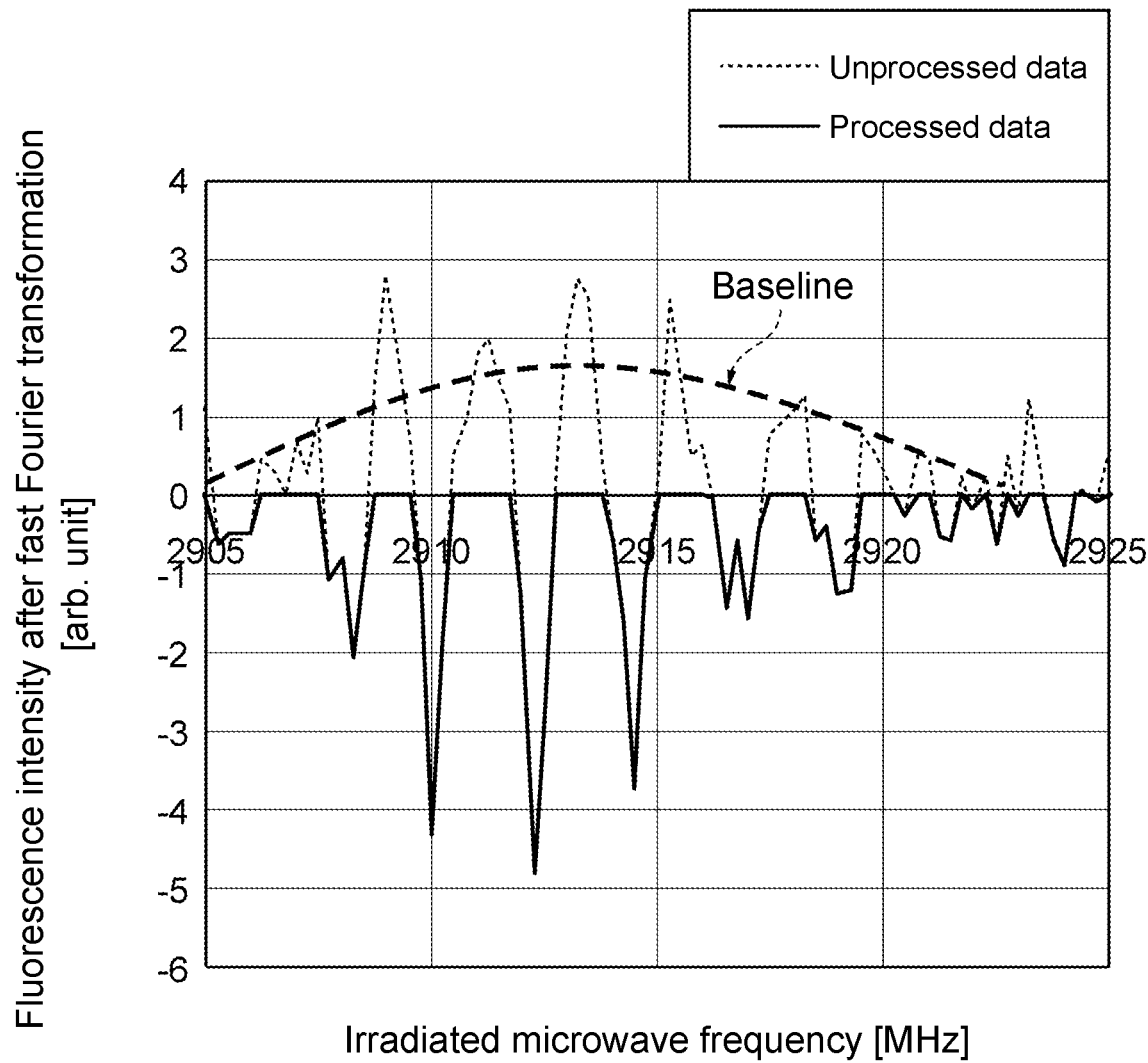
FIG. 9 is a diagram showing a fluorescence intensity after a fast Fourier transformation, for explaining a problem.

FIG. 9 is a diagram showing a fluorescence intensity after a fast Fourier transformation, for explaining a problem. In FIG. 9, the graph shown by the dashed line (unprocessed data) is a spectrum obtained through the process steps up to the inverse fast Fourier transform step S27, where fc is 0.4 (1/MHz). As can be seen from FIG. 9, "remove frequency when FFT frequency<fc" in step S26 makes the peaks appear clearly, while making the baseline curved. The curve of the baseline produces a large separation from the Lorentzian function, which may cause a lower fitting accuracy, by extension, a lower accuracy in estimating a magnetic field strength.

As will be described in detail later in Example 11, the inventor of the present application actually performed a fitting process directly on the unprocessed data and found that an effect of improving the accuracy in estimating a magnetic field strength was not obtained. In contrast, by zeroing a value larger than 0 of the fluorescence intensity in step S28, the baseline of the spectrum after the inverse fast Fourier transformation can mathematically converge to 0, and the fitting accuracy can be improved. That is, using the same value (0) in the processing regardless of the spectrum can improve the fitting accuracy. Note that in FIG. 9, the graph shown by the solid line (processed data) is a result of the processing of zeroing a value larger than 0 of the fluorescence intensity.

In the fitting step S29 following the fluorescence intensity post-processing step S28, using a Lorentzian function, for example, the control unit 5 performs fitting on the fluorescence intensity (i.e., the post-processed fluorescence intensity) obtained in step S28, and estimates a resonance frequency as described in the above step S15.

Figure 10:
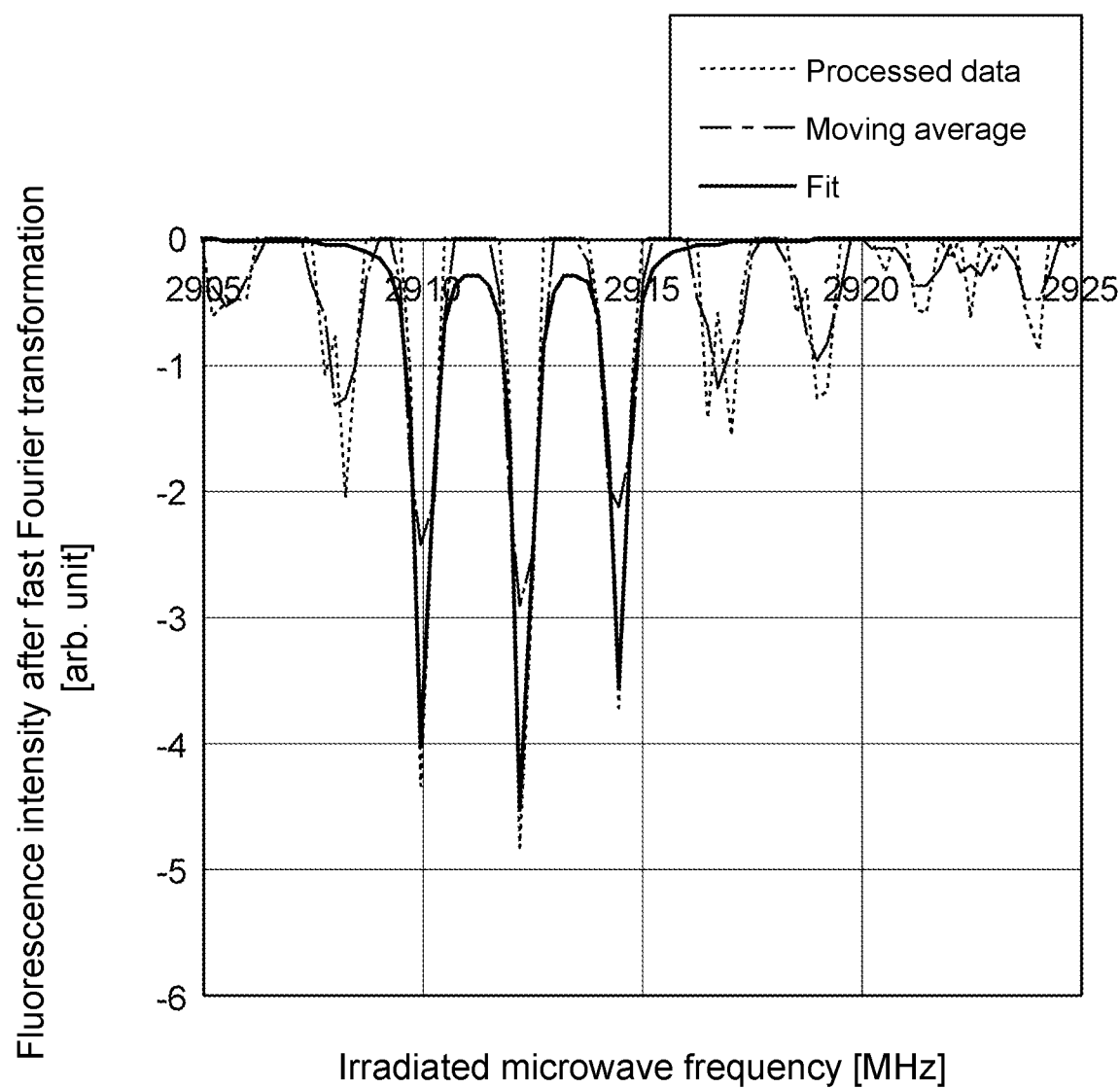
FIG. 10 is a diagram showing a result of a fluorescence intensity fitting step after a processing of zeroing a value larger than 0 of the fluorescence intensity.

FIG. 10 shows a result of the fitting step after the processing of zeroing a value larger than 0 of the fluorescence intensity. In FIG. 10, the moving average shown by the dashed and single-dotted lines is an auxiliary line used so that it is easier to understood visually. Further, the fit shown by the solid line is a result of directly fitting data obtained by the processing of zeroing a value larger than 0 of the fluorescence intensity. As can be seen from FIG. 10, the processing of zeroing a value larger than 0 of the fluorescence intensity makes the peaks of the spectrum appear clearly. That is, the processing of zeroing a value larger than 0 of the fluorescence intensity can improve the fitting accuracy.

In the magnetic field strength estimation step S30 following the fitting step S29, as described in the above step S15, the control unit 5 estimates a magnetic field strength B (that is, the strength of the external magnetic field applied by the magnetic field source 8) by $B=\Delta f/\gamma$ based on the resonance frequency.

Among the above-described steps, the external magnetic field application step S21 to the fluorescence detection step S24 correspond to the step of "detecting" recited in the claims, and the fast Fourier transform step S25 to the fluorescence intensity post-processing step S28 correspond to the step of "removing" recited in the claims.

The method of estimating a magnetic field strength according to the present embodiment performs a fast Fourier transform on the intensity-time signal of the detected fluorescence to acquire FFT frequencies of the fluorescence, removes, as noise, a frequency lower than the frequency threshold fc from the acquired FFT frequencies, and performs an inverse fast Fourier transform on the remaining FFT frequency to acquire a fluorescence intensity. Such a method can suitably remove environmental noise, such as fluctuations in electric field and fluctuations in magnetic field, and also other noise, such as fluctuations in excitation light, and thus can obtain a higher accuracy in estimating a magnetic field strength. Consequently, even in the measurement environment including the fluctuations in electric field and fluctuations in magnetic field and the fluctuations in excitation light, precise estimation of a magnetic field strength can be achieved using the diamond sensor 1.

COMPARATIVE EXAMPLES AND EXAMPLES

To verify the effect of the estimation method of the present embodiment and the like, the inventor of the present application conducted the following Comparative Examples and Examples. In Comparative Examples and Examples, the effect was verified through evaluation of the accuracy in estimating a magnetic field strength. Note that the accuracy in estimating a magnetic field strength is a standard deviation of the estimate obtained by fitting, expressed in the unit μT, where the smaller the value, the higher the estimation accuracy.

Comparative Example 1

In Comparative Example 1, using the above-described diamond sensor 1 and the method described in Felix M. Sturner et al. (see FIG. 3), the accuracy in estimating a magnetic field strength was evaluated under the conditions shown in Table 1. As shown in Table 1, microwave sweep was performed once on the diamond 31 in Comparative Example 1. The estimation accuracy of Comparative Example 1 is shown in Table 1.

Comparative Example 2

In Comparative Example 2, using the above-described diamond sensor 1 and the method described in Felix M. Sturner et al. (see FIG. 3), as shown in Table 1, microwave sweep was performed ten times on the diamond 31, and the accuracy in estimating a magnetic field strength was evaluated. That is, the microwave irradiation and sweep step S13 and the fluorescence detection step S14 were repeated ten times, and the acquired intensity-time signals of the fluorescence for ten times of sweep were averaged. The estimation accuracy of Comparative Example 2 is shown in Table 1.

Comparative Example 3

In Comparative Example 3, using the above-described diamond sensor 1 and the method described in Felix M. Sturner et al. (see FIG. 3), as shown in Table 1, microwave sweep was performed once on the diamond 31, a moving average was applied for noise removal, and the accuracy in estimating a magnetic field strength was evaluated. The estimation accuracy of Comparative Example 3 is shown in Table 1.

Comparative Example 4

In Comparative Example 4, using the above-described diamond sensor 1 and the method described in Felix M. Sturner et al. (see FIG. 3), as shown in Table 1, microwave sweep was performed ten times, a moving average was applied to each result, and the accuracy in estimating a magnetic field strength was evaluated. The estimation accuracy of Comparative Example 4 is shown in Table 1.

As shown in Table 1, the accuracy in estimating a magnetic field strength was 1.9 µT in both Comparative Example 1 and Comparative Example 2. Thus, it was found that, in the conventional method (i.e., the method described in Felix M. Sturner et al.), the arithmetic average was not effective in improving the estimation accuracy. In addition, in view of the results of Comparative Examples 1 and 3, it was found that the moving average was not effective in improving the estimation accuracy. Furthermore, in view of the results of Comparative Examples 1 and 4, it was also found that the combination of the arithmetic average and the moving average was not effective in improving the estimation accuracy.

TABLE 1

|  | Comparative Example 1 | Comparative Example 2 | Comparative Example 3 | Comparative Example 4 |
|---|---|---|---|---|
| Arithmetic Average Count | 1 | 10 | 1 | 10 |
| Moving Average Applied? | No | No | Yes | Yes |
| Magnetic Field Strength Estimation Accuracy (µT) | 1.9 | 1.9 | 2.0 | 2.2 |

Example 1

In Example 1, using the above-described diamond sensor 1 and the estimation method shown in FIG. 4, the accuracy in estimating a magnetic field strength was evaluated under the conditions shown in Table 2. As shown in Table 2, the frequency threshold fc was set to 0.1 (1/MHz) in the above-described FFT frequency removal step S26. That is, in Example 1, a frequency lower than the frequency threshold fc=0.1 (1/MHz) was removed as noise. In addition, in the microwave irradiation and sweep step S23, microwave sweep was performed once on the diamond 31.

As shown in Table 2, the accuracy in estimating a magnetic field strength was 1.4 µT in Example 1, which was higher than the accuracy (1.9 µT) in the above-described Comparative Example 1. Consequently, it was shown that the estimation method of the present embodiment could obtain a higher accuracy in estimating a magnetic field strength.

Example 2

In Example 2, using the above-described diamond sensor 1 and the estimation method shown in FIG. 4, the accuracy in estimating a magnetic field strength was evaluated under the conditions shown in Table 2. As shown in Table 2, the frequency threshold fc was set to 0.3 (1/MHz) in the above-described FFT frequency removal step S26. That is, in Example 2, a frequency lower than the frequency threshold fc=0.3 (1/MHz) was removed as noise. In addition, in the microwave irradiation and sweep step S23, microwave sweep was performed once on the diamond 31.

As shown in Table 2, the accuracy in estimating a magnetic field strength was 1.2 µT in Example 2, which was higher than the accuracy (1.9 µT) in the above-described Comparative Example 1. Consequently, it was shown that the estimation method of the present embodiment could obtain a higher accuracy in estimating a magnetic field strength.

Example 3

In Example 3, using the above-described diamond sensor 1 and the estimation method shown in FIG. 4, the accuracy in estimating a magnetic field strength was evaluated under the conditions shown in Table 2. As shown in Table 2, the frequency threshold fc was set to 0.4 (1/MHz) in the above-described FFT frequency removal step S26. That is, in Example 3, a frequency lower than the frequency threshold fc=0.4 (1/MHz) was removed as noise. In addition, in the microwave irradiation and sweep step S23, microwave sweep was performed once on the diamond 31.

As shown in Table 2, the accuracy in estimating a magnetic field strength was 1.0 µT in Example 3, which was higher than the accuracy (1.9 µT) in the above-described Comparative Example 1. Consequently, it was shown that the estimation method of the present embodiment could obtain a higher accuracy in estimating a magnetic field strength.

Example 4

In Example 4, using the above-described diamond sensor 1 and the estimation method shown in FIG. 4, the accuracy in estimating a magnetic field strength was evaluated under the conditions shown in Table 2. As shown in Table 2, the frequency threshold fc was set to 0.5 (1/MHz) in the above-described FFT frequency removal step S26. That is, in Example 4, a frequency lower than the frequency threshold fc=0.5 (1/MHz) was removed as noise. In addition, in the microwave irradiation and sweep step S23, microwave sweep was performed once on the diamond 31.

As shown in Table 2, it was found that the accuracy in estimating a magnetic field strength was 3.2 µT in Example 4, which indicated a decrease in the estimation accuracy as compared to the above-described Comparative Example 1 (1.9 µT).

Example 5

In Example 5, using the above-described diamond sensor 1 and the estimation method shown in FIG. 4, the accuracy in estimating a magnetic field strength was evaluated under the conditions shown in Table 2. As shown in Table 2, the frequency threshold fc was set to 0.7 (1/MHz) in the above-described FFT frequency removal step S26. That is, in Example 5, a frequency lower than the frequency threshold fc=0.7 (1/MHz) was removed as noise. In addition, in the microwave irradiation and sweep step S23, microwave sweep was performed once on the diamond 31.

As shown in Table 2, it was found that the accuracy in estimating a magnetic field strength in Example 5 was too low to perform fitting with a Lorentzian function.

In view of the results of Examples 1 to 5, it was found that to improve the accuracy in estimating a magnetic field strength, the frequency threshold fc need to be 0.4 (1/MHz) or smaller.

TABLE 2

|  | Example 1 | Example 2 | Example 3 | Example 4 | Example 5 |
|---|---|---|---|---|---|
| fc(1/MHz) | 0.1 | 0.3 | 0.4 | 0.5 | 0.7 |
| Arithmetic Average Count | 1 | 1 | 1 | 1 | 1 |
| Magnetic Field Strength Estimation Accuracy (μT) | 1.4 | 1.2 | 1.0 | 3.2 | N.A. (Fitting impossible.) |

Example 6

In Example 6, using the above-described diamond sensor 1 and the estimation method shown in FIG. 4, the accuracy in estimating a magnetic field strength was evaluated under the conditions shown in Table 3. As shown in Table 3, microwave sweep was performed ten times on the diamond 31. That is, the microwave irradiation and sweep step S23 and the fluorescence detection step S24 were repeated ten times, and the acquired intensity-time signals of the fluorescence for ten times of sweep were averaged. In addition, the frequency threshold fc was set to 0.1 (1/MHz) in the FFT frequency removal step S26.

As shown in Table 3, it was found that the accuracy in estimating a magnetic field strength was 0.69 μT in Example 6, which indicated an improvement in the estimation accuracy as compared to the above-described Comparative Example 2 (1.9 μT) where microwave sweep was performed ten times in the same manner, and also indicated a further improvement in the estimation accuracy as compared to Example 1 (1.4 μT) where the same frequency threshold fc was used.

Example 7

In Example 7, using the above-described diamond sensor 1 and the estimation method shown in FIG. 4, the accuracy in estimating a magnetic field strength was evaluated under the conditions shown in Table 3. As shown in Table 3, microwave sweep was performed ten times on the diamond 31. That is, the microwave irradiation and sweep step S23 and the fluorescence detection step S24 were repeated ten times, and the acquired intensity-time signals of the fluorescence for ten times of sweep were averaged. In addition, the frequency threshold fc was set to 0.3 (1/MHz) in the FFT frequency removal step S26.

As shown in Table 3, it was found that the accuracy in estimating a magnetic field strength was 0.58 μT in Example 7, which indicated an improvement in the estimation accuracy as compared to the above-described Comparative Example 2 (1.9 μT) where microwave sweep was performed ten times in the same manner, and also indicated a further improvement in the estimation accuracy as compared to Example 2 (1.2 μT) where the same frequency threshold fc was used.

Example 8

In Example 8, using the above-described diamond sensor 1 and the estimation method shown in FIG. 4, the accuracy in estimating a magnetic field strength was evaluated under the conditions shown in Table 3. As shown in Table 3, microwave sweep was performed ten times on the diamond 31. That is, the microwave irradiation and sweep step S23 and the fluorescence detection step S24 were repeated ten times, and the acquired intensity-time signals of the fluorescence for ten times of sweep were averaged. In addition, the frequency threshold fc was set to 0.4 (1/MHz) in the FFT frequency removal step S26.

As shown in Table 3, it was found that the accuracy in estimating a magnetic field strength was 0.53 μT in Example 8, which indicated an improvement in the estimation accuracy as compared to the above-described Comparative Example 2 (1.9 μT) where microwave sweep was performed ten times in the same manner, and also indicated a further improvement in the estimation accuracy as compared to Example 3 (1.0 μT) where the same frequency threshold fc was used.

Example 9

In Example 9, using the above-described diamond sensor 1 and the estimation method shown in FIG. 4, the accuracy in estimating a magnetic field strength was evaluated under the conditions shown in Table 3. As shown in Table 3, microwave sweep was performed ten times on the diamond 31. That is, the microwave irradiation and sweep step S23 and the fluorescence detection step S24 were repeated ten times, and the acquired intensity-time signals of the fluorescence for ten times of sweep were averaged. In addition, the frequency threshold fc was set to 0.5 (1/MHz) in the FFT frequency removal step S26.

As shown in Table 3, it was found that the accuracy in estimating a magnetic field strength was 1.0 μT in Example 9, which indicated an improvement in the estimation accuracy as compared to the above-described Comparative Example 2 (1.9 μT) where microwave sweep was performed ten times in the same manner, and also indicated an improvement in the estimation accuracy as compared to Example 4 (3.2 μT) where the same frequency threshold fc was used. In Example 9, however, the estimation accuracy was lower than the accuracies in Examples 6 to 8.

Example 10

In Example 10, using the above-described diamond sensor 1 and the estimation method shown in FIG. 4, the accuracy in estimating a magnetic field strength was evaluated under the conditions shown in Table 3. As shown in Table 3, microwave sweep was performed ten times on the diamond 31. That is, the microwave irradiation and sweep step S23 and the fluorescence detection step S24 were repeated ten times, and the acquired intensity-time signals of the fluorescence for ten times of sweep were averaged. In addition, the frequency threshold fc was set to 0.7 (1/MHz) in the FFT frequency removal step S26.

As shown in Table 3, it was found that the accuracy in estimating a magnetic field strength in Example 10 was too low to perform fitting with a Lorentzian function as in the above-described Example 5.

In view of the results of Examples 6 to 10, it was found that use of the arithmetic average could further improve the estimation accuracy on the precondition that the frequency threshold fc was 0.4 (1/MHz) or smaller. Accordingly, a much higher accuracy in estimating a magnetic field strength can be obtained by performing the microwave irradiation and sweep step S23 and the fluorescence detection step S24 multiple times and averaging of the fluorescence detected multiple times.

In view of the result of Example 9, it was found that, even when the frequency threshold fc was 0.5 (1/MHz), use of the arithmetic average could improve the accuracy in estimating a magnetic field strength as compared to the conventional method.

TABLE 3

|  | Example 6 | Example 7 | Example 8 | Example 9 | Example 10 |
|---|---|---|---|---|---|
| fc(1/MHz) | 0.1 | 0.3 | 0.4 | 0.5 | 0.7 |
| Arithmetic Average Count | 10 | 10 | 10 | 10 | 10 |
| Magnetic Field Strength Estimation Accuracy (μT) | 0.69 | 0.58 | 0.53 | 1.0 | N.A. (Fitting impossible.) |

In addition, provided that the frequency threshold fc is set to 0.4 (1/MHz), as shown in Table 4, the inventor of the present application prepared the following cases for post-processing on the fluorescence intensity (i.e., spectrum) obtained in the above-described inverse fast Fourier transform step S27: omit the fluorescence intensity post-processing step S28 (shown as "No post-processing" in Table 4); square the fluorescence intensity and then add a minus sign, instead of the fluorescence intensity post-processing step S28 (shown as "Square and add a minus sign" in Table 4); and cube the fluorescence intensity, instead of the fluorescence intensity post-processing step S28 (shown as "Cube" in Table 4). The inventor of the present application evaluated the accuracy in estimating a magnetic field strength in each of the cases, and compared with the accuracy in the above-described Example 3 (shown as "Zero a value larger than 0 of fluorescence intensity" in Table 4).

Example 11

Example 11 is an example corresponding to "No post-processing" in Table 4. In Example 11, using the above-described diamond sensor 1 and the estimation method shown in FIG. 4, the accuracy in estimating a magnetic field strength was evaluated under the conditions shown in Table 4. The fluorescence intensity post-processing step S28 was omitted. That is, in Example 11, with the frequency threshold fc set to 0.4 (1/MHz) in the above-described FFT frequency removal step S26, the fitting step S29 was performed directly after the inverse fast Fourier transform step S27, without performing the fluorescence intensity post-processing step S28. Note that in the microwave irradiation and sweep step S23, microwave sweep was performed once.

As shown in Table 4, it was found that the accuracy in estimating a magnetic field strength was 3.7 μT in Example 11, which indicated a decrease in the estimation accuracy as compared to Example 3 (1.0 μT) where the fluorescence intensity post-processing step S28 was performed. Accordingly, it was shown that the processing of zeroing a value larger than 0 of the fluorescence intensity could improve the fitting accuracy and could improve the accuracy in estimating a magnetic field strength.

Example 12

Example 12 is an example corresponding to "Square and add a minus sign" in Table 4. In Example 12, using the above-described diamond sensor 1 and the estimation method shown in FIG. 4, the accuracy in estimating a magnetic field strength was evaluated under the conditions shown in Table 4. The processing of squaring the fluorescence intensity and then adding a minus sign was performed, instead of the fluorescence intensity post-processing step S28. That is, in Example 12, with the frequency threshold fc set to 0.4 (1/MHz) in the above-described FFT frequency removal step S26, the processing of squaring the obtained fluorescence intensity and then adding a minus sign was performed after the inverse fast Fourier transform step S27 and then the fitting step S29 was performed. Note that in the microwave irradiation and sweep step S23, microwave sweep was performed once.

As shown in Table 4, it was found that the accuracy in estimating a magnetic field strength was 1.7 μT in Example 12, which indicated a decrease in the estimation accuracy as compared to Example 3 (1.0 μT) where the fluorescence intensity post-processing step S28 was performed. Accordingly, it was shown that the processing of zeroing a value larger than 0 of the fluorescence intensity could improve the accuracy in estimating a magnetic field strength as compared to the processing of squaring the fluorescence intensity and then adding a minus sign.

Note that from Table 4 and Table 1, it was found that the accuracy (1.7 μT) in estimating a magnetic field strength in Example 12 was higher than the accuracy (1.9 μT) in Comparative Example 1. It was shown that the processing of squaring the fluorescence intensity and then adding a minus sign could improve the fitting accuracy and was effective to some extent in improving the estimation accuracy.

Figure 11:
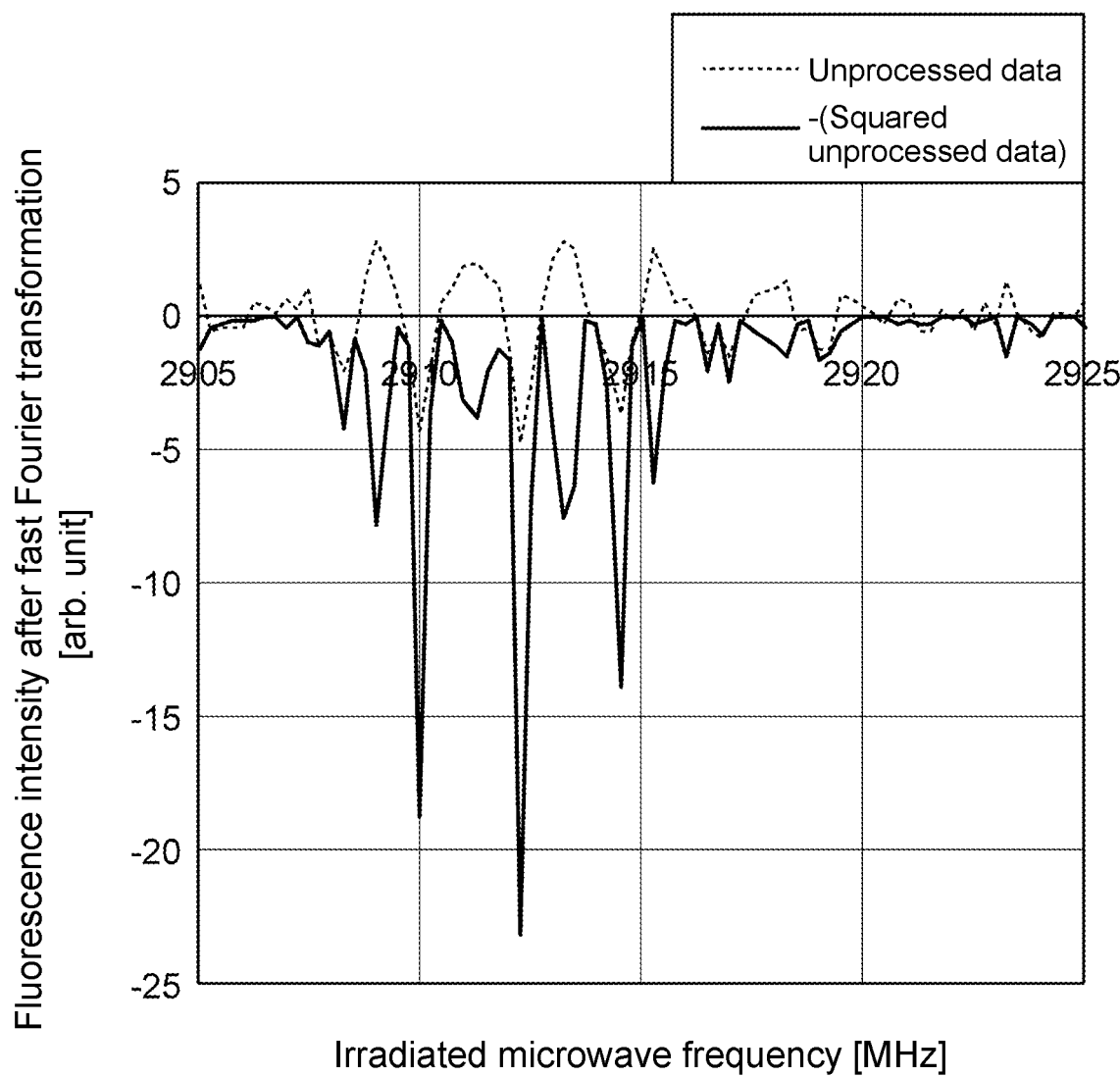
FIG. 11 is a diagram for explaining a processing of squaring the fluorescence intensity and then adding a minus sign.

FIG. 11 is a diagram for explaining the processing of squaring the fluorescence intensity and then adding a minus sign. In FIG. 11, the graph shown by the dashed line is unprocessed data, that is, the data obtained in the inverse fast Fourier transform step S27. The graph shown by the solid line is obtained by performing the processing of squaring the fluorescence intensity and then adding a minus sign. Note that the reason why the minus sign is added here is to fit the data to the downwardly projecting Lorentzian function. Squaring the fluorescence intensity and then adding a minus sign can place the upper limit in the opposite position.

Example 13

Example 13 is an example corresponding to "Cube" in Table 4. In Example 13, using the above-described diamond sensor 1 and the estimation method shown in FIG. 4, the accuracy in estimating a magnetic field strength was evaluated under the conditions shown in Table 4. The processing of cubing the fluorescence intensity was performed, instead of the fluorescence intensity post-processing step S28. That is, in Example 13, with the frequency threshold fc set to 0.4 (1/MHz) in the above-described FFT frequency removal step S26, the obtained fluorescence intensity was cubed after the inverse fast Fourier transform step S27 and then the fitting step S29 was performed. Note that in the microwave irradiation and sweep step S23, microwave sweep was performed once.

As shown in Table 4, it was found that the accuracy in estimating a magnetic field strength was 2.7 μT in Example 13, which indicated a decrease in the estimation accuracy as compared to Example 3 (1.0 μT) where the fluorescence intensity post-processing step S28 was performed. Accordingly, it was shown that the processing of zeroing a value larger than 0 of the fluorescence intensity could improve the accuracy in estimating a magnetic field strength as compared to the processing of cubing the fluorescence intensity.

Figure 12:
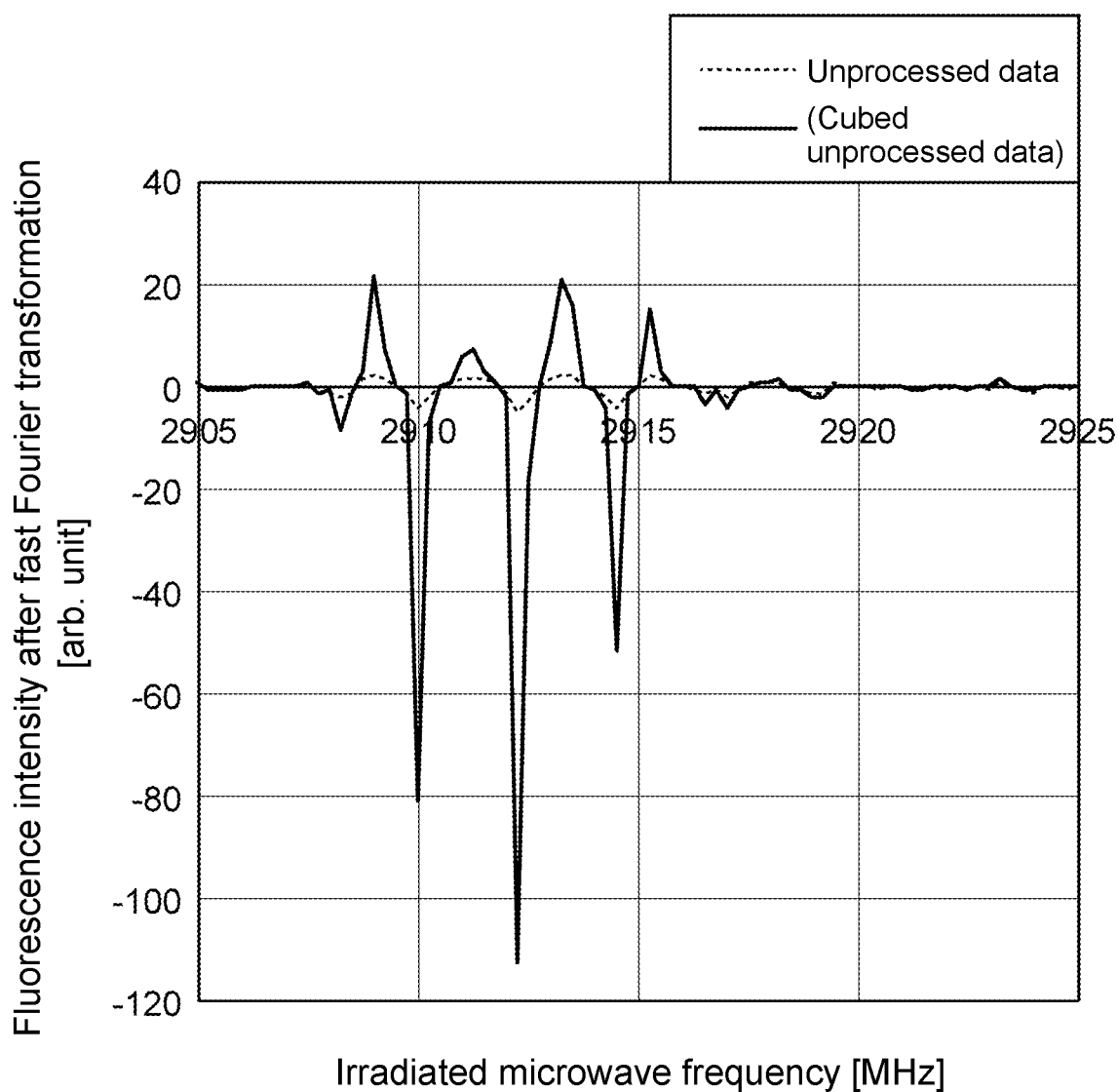
FIG. 12 is a diagram for explaining a processing of cubing the fluorescence intensity.

FIG. 12 is a diagram for explaining the processing of cubing the fluorescence intensity. In FIG. 12, the graph shown by the dashed line is unprocessed data, that is, the data obtained in the inverse fast Fourier transform step S27.

The graph shown by the solid line is obtained by performing the processing of cubing the fluorescence intensity.

TABLE 4

|  | Example 3 | Example 11 | Example 12 | Example 13 |
|---|---|---|---|---|
| fc(1/MHz) | 0.4 | 0.4 | 0.4 | 0.4 |
| Post-processing | Zero a value larger than 0 of fluorescence intensity | No post-processing | Square and add a minus sign | Cube |
| Arithmetic Average Count | 1 | 1 | 1 | 1 |
| Magnetic Field Strength Estimation Accuracy (µT) | 1.0 | 3.7 | 1.7 | 2.7 |

In addition, provided that microwave sweep is performed ten times and the frequency threshold fc is set to 0.4 (1/MHz), as shown in Table 5, the inventor of the present application prepared the following cases for post-processing on the fluorescence intensity (i.e., spectrum) obtained in the above-described inverse fast Fourier transform step S27: omit the fluorescence intensity post-processing step S28 (shown as "No post-processing" in Table 5); square the fluorescence intensity and then add a minus sign, instead of the fluorescence intensity post-processing step S28 (shown as "Square and add a minus sign" in Table 5); and cube the fluorescence intensity, instead of the fluorescence intensity post-processing step S28 (shown as "Cube" in Table 5). The inventor of the present application evaluated the accuracy in estimating a magnetic field strength in each of the cases, and compared with the accuracy in the above-described Example 8 (shown as "Zero a value larger than 0 of fluorescence intensity" in Table 5).

Example 14

Example 14 is an example corresponding to "No post-processing" in Table 5. In Example 14, using the above-described diamond sensor 1 and the estimation method shown in FIG. 4, the accuracy in estimating a magnetic field strength was evaluated under the conditions shown in Table 5. The fluorescence intensity post-processing step S28 was omitted. That is, in Example 14, with the frequency threshold fc set to 0.4 (1/MHz) in the above-described FFT frequency removal step S26, the fitting step S29 was performed directly after the inverse fast Fourier transform step S27, without performing the fluorescence intensity post-processing step S28. Note that in the microwave irradiation and sweep step S23, microwave sweep was performed ten times, and the acquired intensity-time signals of the fluorescence for ten times of sweep were averaged.

As shown in Table 5, it was found that the accuracy in estimating a magnetic field strength was 3.0 µT in Example 14, which indicated a decrease in the estimation accuracy as compared to Example 8 (0.53 µT) where the fluorescence intensity post-processing step S28 was performed. Accordingly, it was shown that the processing of zeroing a value larger than 0 of the fluorescence intensity could improve the fitting accuracy and could improve the accuracy in estimating a magnetic field strength.

Example 15

Example 15 is an example corresponding to "Square and add a minus sign" in Table 5. In Example 15, using the above-described diamond sensor 1 and the estimation method shown in FIG. 4, the accuracy in estimating a magnetic field strength was evaluated under the conditions shown in Table 5. The processing of squaring the fluorescence intensity and then adding a minus sign was performed, instead of the fluorescence intensity post-processing step S28. That is, in Example 15, with the frequency threshold fc set to 0.4 (1/MHz) in the above-described FFT frequency removal step S26, the processing of squaring the obtained fluorescence intensity and then adding a minus sign was performed after the inverse fast Fourier transform step S27 and then the fitting step S29 was performed. Note that in the microwave irradiation and sweep step S23, microwave sweep was performed ten times, and the acquired intensity-time signals of the fluorescence for ten times of sweep were averaged.

As shown in Table 5, it was found that the accuracy in estimating a magnetic field strength was 1.1 µT in Example 15, which indicated a decrease in the estimation accuracy as compared to Example 8 (0.53 µT) where the fluorescence intensity post-processing step S28 was performed. Accordingly, it was shown that the processing of zeroing a value larger than 0 of the fluorescence intensity could improve the accuracy in estimating a magnetic field strength as compared to the processing of squaring the fluorescence intensity and then adding a minus sign.

Note that from Table 5 and Table 1, it was found that the accuracy (1.1 µT) in estimating a magnetic field strength in Example 15 was higher than the accuracy (1.9 µT) in Comparative Example 2. It was shown that the processing of squaring the fluorescence intensity and then adding a minus sign could improve the fitting accuracy and was effective to some extent in improving the estimation accuracy.

Example 16

Example 16 is an example corresponding to "Cube" in Table 5. In Example 16, using the above-described diamond sensor 1 and the estimation method shown in FIG. 4, the accuracy in estimating a magnetic field strength was evaluated under the conditions shown in Table 5. The processing of cubing the fluorescence intensity was performed, instead of the fluorescence intensity post-processing step S28. That is, in Example 16, with the frequency threshold fc set to 0.4 (1/MHz) in the above-described FFT frequency removal step S26, the obtained fluorescence intensity was cubed after the inverse fast Fourier transform step S27 and then the fitting step S29 was performed. Note that in the microwave irradiation and sweep step S23, microwave sweep was performed ten times, and the acquired intensity-time signals of the fluorescence for ten times of sweep were averaged.

As shown in Table 5, it was found that the accuracy in estimating a magnetic field strength was 5.9 µT in Example 16, which indicated a decrease in the estimation accuracy as compared to Example 8 (0.53 µT) where the fluorescence intensity post-processing step S28 was performed. Accordingly, it was shown that the processing of zeroing a value larger than 0 of the fluorescence intensity could improve the accuracy in estimating a magnetic field strength as compared to the processing of cubing the fluorescence intensity.

TABLE 5

|  | Example 8 | Example 14 | Example 15 | Example 16 |
|---|---|---|---|---|
| fc(1/MHz) | 0.4 | 0.4 | 0.4 | 0.4 |
| Post-processing | Zero a value larger than 0 of fluorescence intensity | No post-processing | Square and add a minus sign | Cube |
| Arithmetic Average Count | 10 | 10 | 10 | 10 |
| Magnetic Field Strength Estimation Accuracy (μT) | 0.53 | 3.0 | 1.1 | 5.9 |

Although the embodiment of the present disclosure has been described in detail above, the present disclosure is not limited thereto, and various design changes can be made within the spirit and scope of the present disclosure recited in the claims.

What is claimed is:

1. A method of estimating a magnetic field strength, comprising the steps of:
    detecting fluorescence emitted from a diamond having nitrogen-vacancy centers with an external magnetic field applied thereto, by irradiating the diamond with excitation light and sweeping microwaves;
    removing a long-periodic component of noise components having a value greater than a preset threshold from the detected fluorescence;
    fitting the fluorescence remaining after the removing of noise; and
    estimating a strength of the external magnetic field based on the fluorescence after the fitting.

2. The method of estimating a magnetic field strength according to claim 1, wherein
    the preset threshold is a frequency threshold, and
    the step of removing includes performing a fast Fourier transform on an intensity-time signal of the detected fluorescence to acquire frequencies of the fluorescence, removing, as noise, a frequency lower than the frequency threshold from the acquired frequencies of the fluorescence, and performing an inverse fast Fourier transform on a remaining frequency of the fluorescence.

3. The method of estimating a magnetic field strength according to claim 2, wherein the step of removing includes zeroing a value larger than zero of an intensity of the fluorescence acquired by the inverse fast Fourier transform.

4. The method of estimating a magnetic field strength according to claim 2, wherein the frequency threshold is 0.4 (1/MHz) or smaller.

5. The method of estimating a magnetic field strength according to claim 2, wherein the step of removing includes squaring an intensity of the fluorescence acquired by the inverse fast Fourier transform and then adding a minus sign.

6. The method of estimating a magnetic field strength according to claim 1, wherein the step of detecting includes sweeping the microwaves multiple times on the diamond and averaging of the fluorescence detected multiple times.

* * * * *